Jan. 4, 1927.  H. B. SHIELDS  1,612,839
CLOSURE
Filed June 30, 1926   3 Sheets-Sheet 1
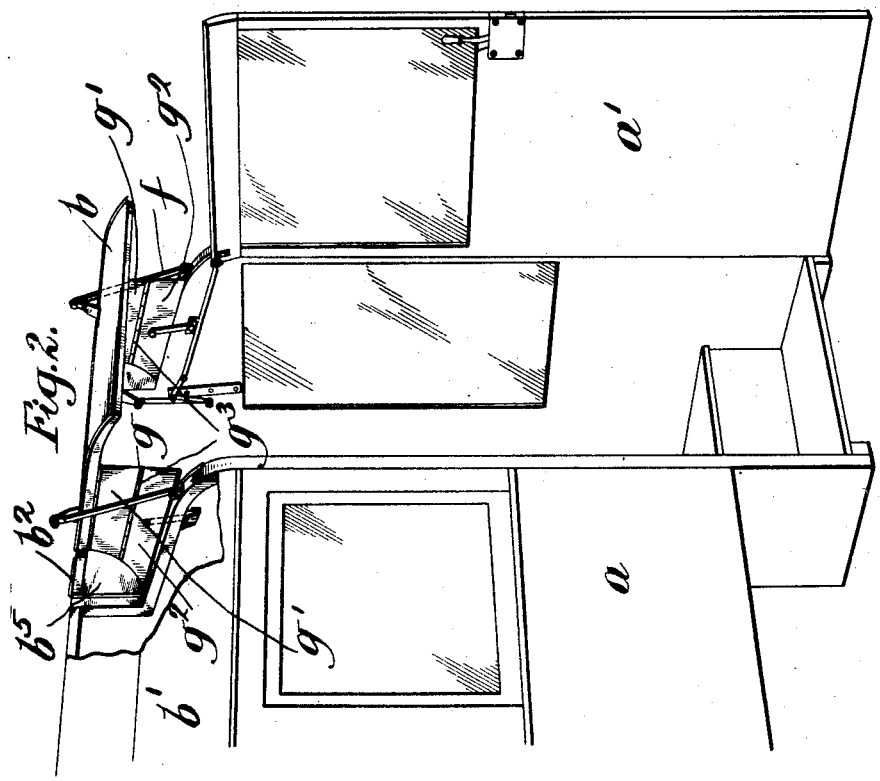
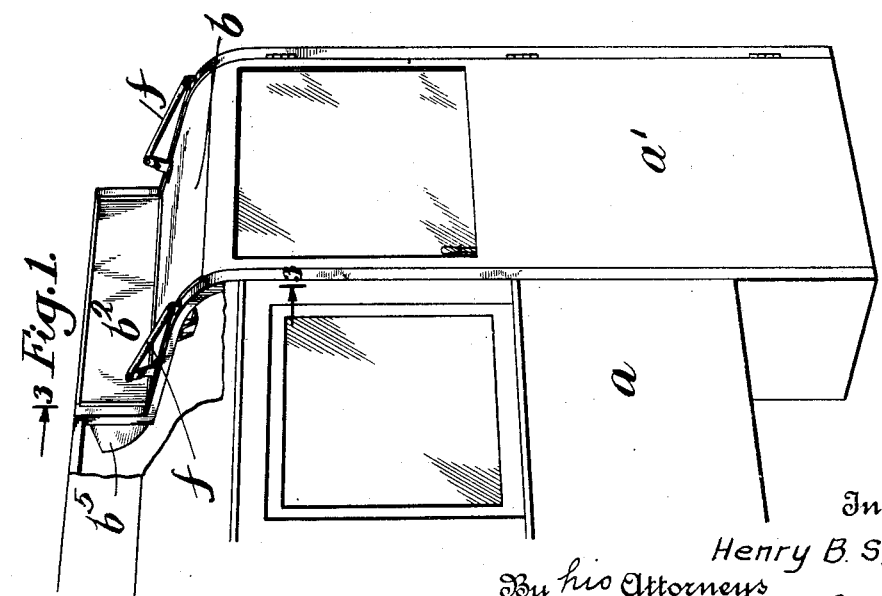
Inventor
Henry B. Shields.
By his Attorneys
Redding, Greeley, O'Shea & Campbell

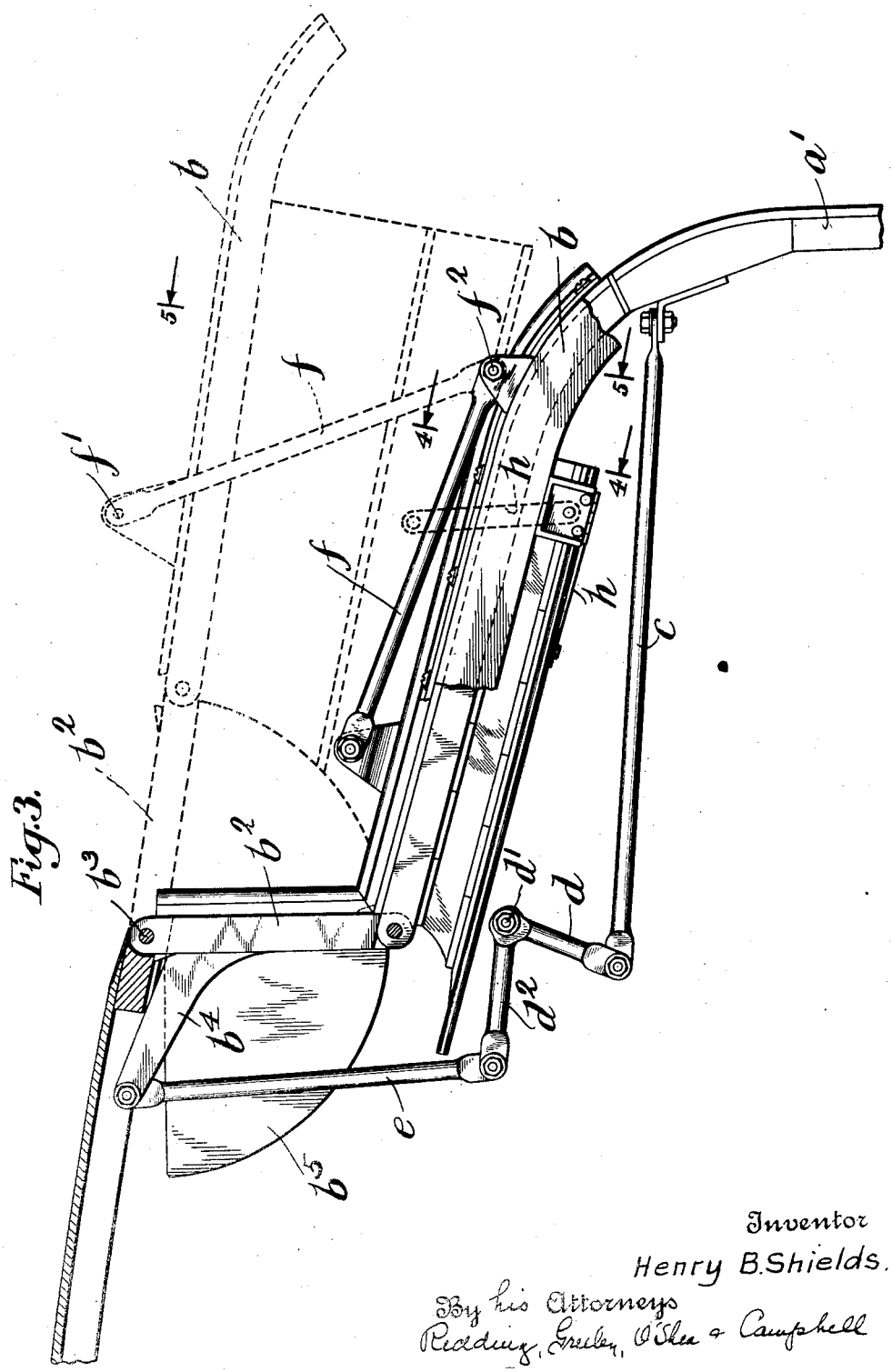

Jan. 4, 1927.  H. B. SHIELDS  1,612,839
CLOSURE
Filed June 30, 1926    3 Sheets-Sheet 3
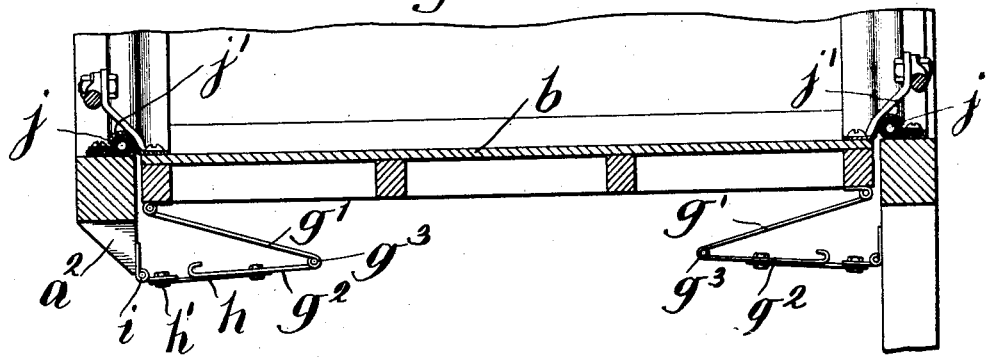
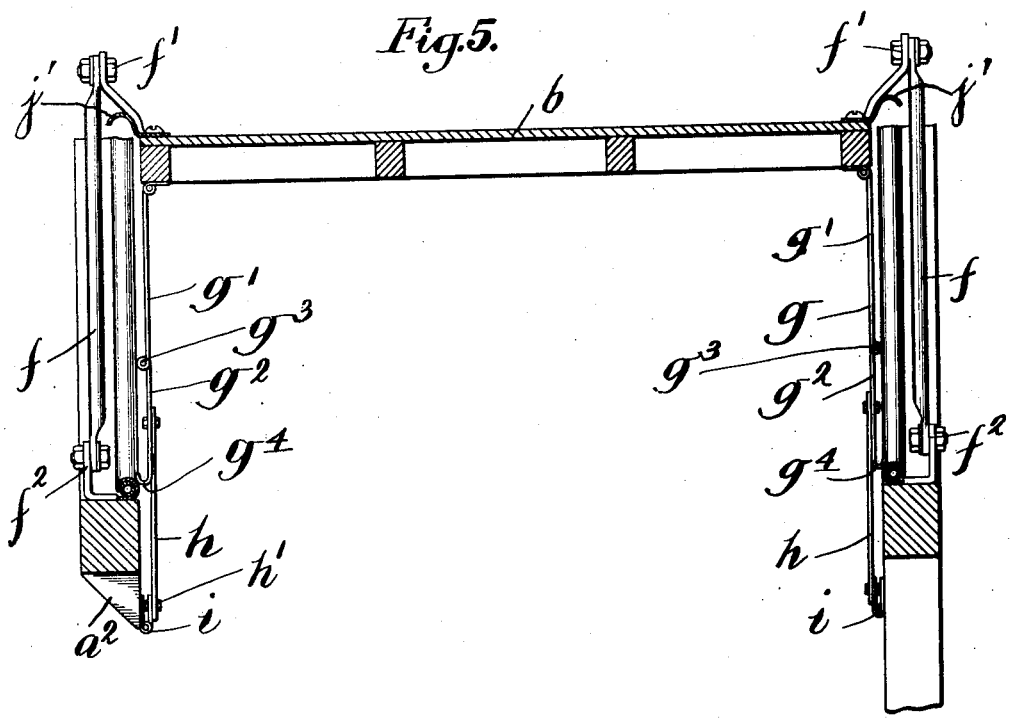
Inventor
Henry B. Shields.
By his Attorneys
Redding, Greeley, O'Shea & Campbell Patented Jan. 4, 1927.

1,612,839

UNITED STATES PATENT OFFICE.

HENRY B. SHIELDS, OF FREEPORT, NEW YORK, ASSIGNOR TO INTERNATIONAL MOTOR COMPANY, OF NEW YORK, N. Y., A CORPORATION OF DELAWARE.

CLOSURE.

Application filed June 30, 1926. Serial No. 119,539.

This invention relates to doors for passenger carrying vehicles, such as motor buses. The present tendency in vehicle design is to maintain the center of gravity of the vehicle as low as possible in the interest of stability, the roof of the vehicle being lowered to the minimum practical height which renders the entering and exit of passengers through the door inconvenient to some extent. The present invention has for its object a temporary increase in the head room in the vicinity of the door to permit a passenger to enter or leave the vehicle in an erect position without fear of striking the head. To this end a section of the roof, immediately over the entrance, is caused to rise simultaneously with the opening of the door and close again when the door is closed. More particularly a section of the roof is capable of being raised and is operatively connected through a series of levers and linkages with the door whereby movement of the door between open and closed positions effects a corresponding movement of the roof section. In order that the invention may be clearly understood the same will now be described in greater particularity in connection with the accompanying drawings illustrating a preferred embodiment thereof, in which:

Figure 1 is a view in perspective showing a fragmentary portion of the closed body of a motor vehicle with the door and roof section in closed position.

Figure 2 is a view similar to Figure 1 but showing the door open and the roof section immediately thereabove raised.

Figure 3 is a view in side elevation showing the operative connections between the door and roof section which effect corresponding movements thereof, the position of the roof section when open being indicated in dotted lines.

Figure 4 is a longitudinal sectional view taken in the plane indicated by the line 4—4 in Figure 3 and looking in the direction of the arrows and showing particularly the devices availed of to seal the line of separation between the movable and immovable sections of the roof against the weather when in closed position.

Figure 5 is a view similar to Figure 4 taken in the plane indicated by the line 5—5 in Figure 3, looking in the direction of the arrows and showing the weather protective devices availed of when the roof section is raised.

The invention has been illustrated in the accompanying drawings as applied to a roof of the monitor type but it is to be understood that the invention is equally applicable in connection with any type of roof whether a plain arched type or otherwise.

Referring first to Figures 1 and 2 the entrance into the body $a$ of the vehicle is closed by a door $a'$ suitably supported in any convenient fashion. To afford adequate head room for a passenger entering or leaving the vehicle when the door $a'$ is open, it is proposed according to the present invention to permit a section $b$ of the roof $b'$ to be raised. To this end the door $a'$ is connected by a link $c$ with one arm $d$ of a bell crank lever pivoted at $d'$ whereby movement in a horizontal direction of the door $a'$ is translated into vertical movement of the link $e$ extending between the other arm $d^2$ of the bell crank and an inwardly directed arm $b^4$ on the vertical roof section $b^2$ so that downward movement of the link $e$ when the door is open serves to rotate the vertical portion $b^2$ of the roof about its point of pivot $b^3$. As the vertical section $b^2$ swings outwardly and upwardly the roof section $b$ is carried outwardly and upwardly to the position indicated in dotted lines in Figure 3, the roof section being supported in its raised position by the links $f$ pivoted at one end, say, $f'$ to the roof section $b$ and at their outer end as at $f^2$ to the immovable portions of the roof immediately adjacent thereto. Conversely when the door is closed movement of the link $c$ to the left in Figure 3 will cause the section $b^2$ to rock downwardly about its pivot $b^3$ to closed position and will return the section $b$ to the plane of the immovable roof section.

In inclement weather it will be found desirable to seal the spaces between the movable and immovable roof sections, respectively, against the admission of rain, snow or wind. To this end the forward and rear edges of the vertical section $b^2$ are provided with shields $b^5$ substantially a quadrant in shape which when the door is closed extend within the body as shown in Figure 1 and when the door is open extend outwardly as shown in Figure 2.

Flexible shields may also be provided between the roof section $b$ and the immovable roof section. Obviously these shields must be capable of a sliding movement. The weather guards $g$ are, therefore, hinged to the edges of the movable section $b$ at their uppermost edge. The shield is formed in two parts $g'$, $g^2$ hinged together as at $g^3$ to permit them to be folded and thus not extend too far downwardly and interfere with the headroom of the vehicle when the door is closed. Accordingly the lower sections $g^2$ of the weather guards are pivotally connected to links $h$ in turn pivotally connected as at $h'$ to hinge-like members $i$ secured to brackets or the like $a^2$ at the sides of the entrance. Thus when the door is closed the guards fold inwardly as shown in Figure 4, the link $h$ falling to the rear as shown in Figure 3 while when the door is opened the weather guard sections lie in substantially the same vertical plane including the link $h$ which has rotated to a substantially vertical position as shown in Figure 3.

The roof opening may also be provided with weather strips comprising yielding non-metalic tubing $j$ secured to the immovable roof section adjacent the opening and adapted to be engaged by a metal beading $j'$ carried with the movable sections $b$ or $b^2$. A similar beading $g^4$ may be formed on the lower edge of the weather guards $g$ adapted to engage the yielding non-metallic material and being trough-shaped also serving as gutters to conduct away any water striking the guards. The yielding non-metallic material not only makes the joints weatherproof and air tight but also because of its snubbing properties eliminates all squeaks and rattles.

It will thus be seen that an entrance for passenger vehicles has been provided wherein the head room is reduced to a minimum while when the entrance is in use the roof immediately thereabove may be raised so as not to interfere with the entrance or exit of passengers.

It is to be understood that various modifications may be made in the configuration of the roof and the form taken by the actuating mechanism effecting movement of the roof to correspond with the movement of the door. Further the absence or presence of the weather protecting devices are not to be considered as affecting the invention in its broadest aspects. Reference will now be had to the appended claims for a delineation of the scope of the invention.

What is claimed is:

1. In a passenger carrying vehicle, the combination with a closed body formed with an entrance, of a monitor type roof formed with an opening above the entrance, a door for the entrance, a closure for the opening comprising a vertical section pivoted at its upper end to the roof, a transversely extending section pivoted to the lower end of the vertical section, means to rock the vertical section about its pivots upon movement of the door and links supporting the transverse section.

2. In a passenger carrying vehicle, the combination with a closed body having an entrance, of a monitor type roof formed with an opening above the entrance, a door for the entrance, a closure for the roof opening comprising a vertical section formed with an inwardly directed arm and pivoted at its upper end to the roof and a transversely extending roof section pivoted to the lower end of the vertical section, links supporting the transverse section from the roof, a bell crank pivoted on the body, a link from the door to one arm of the bell crank and a link connecting the other arm of the bell crank to the arm on the vertical roof section.

3. In a passenger carrying vehicle, the combination with a closed body having an entrance, of a monitor type roof formed with an opening above the entrance, a door for the entrance, a closure for the roof opening comprising a vertical section formed with an inwardly directed arm and pivoted at its upper end to the roof and a transversely extending roof section pivoted to the lower end of the vertical section, links supporting the transverse section from the roof, a bell crank pivoted on the body, a link from the door to one arm of the bell crank, a link connecting the other arm of the bell crank to the arm on the vertical roof section, and weather guards between the movable roof section and the roof.

4. In a passenger carrying vehicle, the combination with a closed body having an entrance, of a monitor type roof formed with an opening above the entrance, a door for the entrance, a closure for the roof opening comprising a vertical section formed with an inwardly directed arm and pivoted at its upper end to the roof and a transversely extending roof section pivoted to the lower end of the vertical section, links supporting the transverse section from the roof, a bell crank pivoted on the body, a link from the door to one arm of the bell crank, a link connecting the other arm of the bell crank to the arm on the vertical roof section, weather guards between the movable roof section and the roof comprising a metallic quadrant secured inwardly of the vertical roof section adapted to extend inwardly of the body when said roof section is in vertical position, and metallic sections hinged together and hinged at their tops to the transverse section, a link swiveled to the lower section and swiveled for movement in a transverse vertical plane to a hinge connection with the body having movement about a transverse axis.

This specification signed this 25 day of June A. D. 1926.

HENRY B. SHIELDS.